(12) United States Patent
Rodriguez

(10) Patent No.: US 7,349,553 B2
(45) Date of Patent: Mar. 25, 2008

(54) WATERMARKS FOR SECURE DISTRIBUTION OF DIGITAL DATA

(75) Inventor: Ismael Rodriguez, El Segundo, CA (US)

(73) Assignee: The Boeing Company, Chicago, IL (US)

(*) Notice: Subject to any disclaimer, the term of this patent is extended or adjusted under 35 U.S.C. 154(b) by 871 days.

(21) Appl. No.: 10/419,490

(22) Filed: Apr. 21, 2003

(65) Prior Publication Data

US 2003/0202679 A1 Oct. 30, 2003

Related U.S. Application Data

(60) Provisional application No. 60/376,106, filed on Apr. 29, 2002.

(51) Int. Cl.
*G06K 9/00* (2006.01)

(52) U.S. Cl. ........................ 382/100; 380/277

(58) Field of Classification Search ............... 382/100
See application file for complete search history.

(56) References Cited

U.S. PATENT DOCUMENTS

| | | | | |
|---|---|---|---|---|
| 5,673,316 A | * | 9/1997 | Auerbach et al. | 705/51 |
| 5,699,427 A | * | 12/1997 | Chow et al. | 705/58 |
| 5,974,141 A | * | 10/1999 | Saito | 705/52 |
| 6,002,772 A | * | 12/1999 | Saito | 705/58 |
| 6,061,451 A | * | 5/2000 | Muratani et al. | 380/201 |
| 6,069,955 A | * | 5/2000 | Coppersmith et al. | 380/54 |
| 6,076,077 A | * | 6/2000 | Saito | 705/51 |
| 6,141,753 A | * | 10/2000 | Zhao et al. | 713/176 |
| 6,182,218 B1 | * | 1/2001 | Saito | 713/176 |
| 6,226,618 B1 | * | 5/2001 | Downs et al. | 705/1 |
| 6,233,684 B1 | * | 5/2001 | Stefik et al. | 713/176 |
| 6,398,245 B1 | * | 6/2002 | Gruse et al. | 280/228 |

(Continued)

FOREIGN PATENT DOCUMENTS

| | | |
|---|---|---|
| EP | 0 746 126 A2 | 12/1996 |
| EP | 0 798 892 A2 | 10/1997 |
| EP | 884669 A2 * | 12/1998 |
| EP | 0 982 927 A1 | 3/2000 |
| JP | 2002236669 A * | 8/2002 |

OTHER PUBLICATIONS

Kirovski et al., "Digital Rights Management for Digital Cinema," Inter. Symp. on Optical Science & Tech.—Security in Imaging: Theory & Applications, San Diego, CA, Jul. 2001, 16 pages.*

(Continued)

*Primary Examiner*—Matthew C. Bella
*Assistant Examiner*—Sath V. Perungavoor
(74) *Attorney, Agent, or Firm*—Gates & Cooper LLP

(57) ABSTRACT

A visible first watermark and invisible second and third watermarks are embedded in digital media content, in order to protect the media content from piracy. The visible first watermark protects the media content during distribution and storage, while the invisible second and third watermarks are embedded in to identify an owner and displaying entity, respectively. The second and third watermark keys can be used to detect the associated watermarks for forensic purposes. The first, second and third watermark keys are symmetric keys. A distribution entity embeds the visible first watermark in the media content using the first watermark key and embeds an invisible second watermark in the media content using the second watermark key. The distribution entity transmits the media content with the embedded visible first watermark and invisible second watermark to a displaying entity, wherein the displaying entity removes the visible first watermark from the media content using the first watermark key and embeds the invisible third watermark in the media content using the third watermark key.

102 Claims, 4 Drawing Sheets

U.S. PATENT DOCUMENTS

| | | | |
|---|---|---|---|
| 6,490,681 B1* | 12/2002 | Kobayashi et al. | 713/171 |
| 6,687,683 B1* | 2/2004 | Harada et al. | 705/51 |
| 6,801,999 B1* | 10/2004 | Venkatesan et al. | 713/167 |
| 6,809,792 B1* | 10/2004 | Tehranchi et al. | 352/85 |
| 6,834,344 B1* | 12/2004 | Aggarwal et al. | 713/176 |
| 6,842,523 B1* | 1/2005 | Niwa et al. | 380/286 |
| 6,965,996 B2* | 11/2005 | Hirano et al. | 713/176 |
| 7,006,996 B2* | 2/2006 | Hasegawa | 705/52 |
| 7,023,992 B1* | 4/2006 | Kubota et al. | 380/210 |
| 7,031,471 B2* | 4/2006 | Stefik et al. | 380/231 |
| 7,120,802 B2* | 10/2006 | Shear et al. | 713/194 |
| 2001/0004736 A1* | 6/2001 | Hirano et al. | 705/51 |
| 2002/0080964 A1* | 6/2002 | Stone et al. | 380/255 |
| 2003/0105950 A1* | 6/2003 | Hirano et al. | 713/100 |
| 2003/0202659 A1* | 10/2003 | Rodriguez | 380/201 |
| 2003/0202661 A1* | 10/2003 | Rodriguez et al. | 380/239 |
| 2003/0202679 A1* | 10/2003 | Rodriguez | 382/100 |
| 2005/0144134 A1* | 6/2005 | Hirano | 705/51 |
| 2007/0133792 A1* | 6/2007 | Utsumi et al. | 380/51 |
| 2007/0145735 A1* | 6/2007 | Lawandy et al. | 283/72 |

OTHER PUBLICATIONS

Kirovski et al., "Digital Rights Management for Digital Cinema," Inter. Symp. on Optical Science & Tech.—Security in Imaging: Theory & Applications, San Diego, CA, Jul. 2001, 16 pages.

National Association of Theatre Owners; "Digital Cinema User Requirements," Feb. 22, 2002, pp. 1-3.

Hose et al., "Data Transport and Processing in a Digital Cinema Theatre System," Qualcomm Incorporated from the 36th Advanced Motion Imaging Conference, Feb. 7-9, 2002, 21 pages.

Augot, D., et al., "Secure Delivery of Images Over Open Networks", Special issue on identification and protection of multimedia information, Proceedings of the IEEE, Jul. 1999, 87(7): 1251-1266.

Cox, Ingemar J., et al., "Secure Spread Spectrum Watermarking for Multimedia", *IEEE Transactions On Image Processing*, vol. 6, No. 12, Dec. 1997, pp. 1673-1687.

Koch, Eckhard, et al., "Copyright Protection for Multimedia Data", Fraunhofer Institute for Computer Graphics, Darmstadt, Germany, Dec. 16, 1994, pp. 1-15.

Swanson, Mitchell D., et al., "Multiresolution Scene-Based Video Watermarking Using Perceptual Models", *IEEE Journal On Selected Areas In Communications*, vol. 16, No. 4, May 1998, pp. 540-550.

Zhou, Wensheng, et al., "On-line Scene Change Detection of Multicast Video", *IEEE Journal of Visual Communication and Image Representation*, vol. 12, Mar. 2001, pp. 1-16.

Shapiro, Jerome M., "Embedded Image Coding Using Zerotrees of Wavelet Coefficients", *IEEE Transactions on Signal Processing*, vol. 41, No. 12, Dec. 1993, pp. 3445-3462.

Said, Amir, et al., "A New, Fast, and Efficient Image Codec Based On Set Partitioning In Hierarchical Trees", *IEEE Transactions On Circuits and Systems For Video Technology*, vol. 6, No. 3, Jun. 1996, pp. 243-250.

Wolfgang, Raymond B., et al., "Perceptual Watermarks for Digital Images and Video", *Proceedings of the IEEE*, vol. 87, No. 7, Jul. 1999, pp. 1108-1126.

Lin, C. Y., et al., "Rotation, Scale, and Translation Resilient Watermarking for Images", IEEE, Trans. On Image Processing, vol. 10, pp. 767-782, May 2001.

Pereira, S., et al., "Fast Robust Template Matching for Affine Resistant Image Watermarks", Proc. 3rd Int. Information Hiding Workshop, pp. 207-218, 1999.

Solachidis, V., et al., "Circularly Symmetric Watermark Embedding in 2-D DFT Domain", IEEE Trans. On Image Processing, vol. 10, pp. 1741-1753, Nov. 2001.

Stromberg, Michael, "Secure Content Protection: An Overview Of The Proposed Security Mechanisms In Digital Cinema", KTH Advanced Media Technology Lab, 'Online! Sep. 20, 2001, XP002249975 Stockholm, retrieved from the Internet: URL:www.amt.kth.es on Aug. 1, 2003, 17 pages.

Haitsma, J.,et al., "A Watermarking Scheme For Digital Cinema", Proceedings of the International Conference On Image Processing, 'Online! Oct. 7-10, 2001, pp. 487-489, XP002249974 Thessaloniki.

* cited by examiner

WATERMARKS FOR SECURE DISTRIBUTION OF DIGITAL DATA

CROSS-REFERENCE TO RELATED APPLICATIONS

This application claims the benefit under 35 U.S.C. §119(e) of co-pending and commonly-assigned U.S. provisional patent application Ser. No. 60/376,106, filed Apr. 29, 2002, by Ismael Rodriguez, and entitled WATERMARK SCHEME FOR SECURE DISTRIBUTION OF DIGITAL IMAGES AND VIDEO, which application is incorporated by reference herein.

This application is related to the following co-pending and commonly-assigned patent applications:

U.S. Utility patent application Ser. No. 10/419,491, filed on Apr. 21, 2003, by Ismael Rodriguez, entitled VISIBLE WATERMARK TO PROTECT MEDIA CONTENT FROM A SERVER TO PROJECTOR, which application claims the benefit under 35 U.S.C §119(e) of co-pending and commonly-assigned U.S. Provisional Patent Application Ser. No. 60/376,303, filed Apr. 29, 2002, by Ismael Rodriguez, entitled VISIBLE WATERMARK TO PROTECT MEDIA CONTENT FROM A SERVER TO PROJECTOR, U.S. Utility patent application Ser. No. 10/419,489, filed on Apr. 21, 2003, by Troy Rockwood and Wensheng Zhou, entitled NON-REPUDIATION WATERMARKING PROTECTION BASED ON PUBLIC AND PRIVATE KEYS, which application claims the benefit under 35 U.S.C. §119(e) of co-pending and commonly-assigned U.S. Provisional Patent Application Ser. No. 60/376,212, filed Apr. 29, 2002, by Troy Rockwood and Wensheng Zhou, entitled NON-REPUDIATION WATERMARKING PROTECTION APPARATUS AND METHOD BASED ON PUBLIC AND PRIVATE KEY, and U.S. Utility patent application Ser. No. 10/419,495, filed on Apr. 21, 2003, by Wensheng Zhou and Phoom Sagetong, entitled DYNAMIC WAVELET FEATURE-BASED WATERMARK, which application claims the benefit under 35 U.S.C. §119(e) of co-pending and commonly-assigned U.S. Provisional Patent Application Ser. No. 60/376,092, filed Apr. 29, 2002, by Wensheng Zhou and Phoom Sagetong, entitled DYNAMIC WAVELET FEATURE-BASED WATERMARK APPARATUS AND METHOD FOR DIGITAL MOVIES IN DIGITAL CINEMA, all of which applications are incorporated by reference herein.

BACKGROUND OF THE INVENTION

1. Field of the Invention

The invention relates to the field of digital watermarks, and more particularly, to the use of watermarks for the secure distribution of digital data.

2. Description of the Related Art

With the recent growth of networked multimedia systems, techniques are needed to prevent (or at least deter) the illegal copying, forgery and distribution of media content, such as digital audio, images and video. Many approaches are available for protecting digital data; including encryption, authentication and time stamping. It is also desirable to determine where and by how much the digital data has been changed from the original.

One way to improve a claim of ownership over digital data, for instance, is to embed a low-level signal or structure directly into the digital data. For example, a digital watermark uniquely identifies the owner and can be easily extracted from the digital data. If the digital data is copied and distributed, the watermark is distributed along with the data. This is in contrast to the (easily removed) ownership information fields allowed by the MPEG-2 syntax.

Modern digital processing techniques can be used maliciously to remove or replace visible watermarks in digital images or video. To overcome such a problem invisible digital watermarks have been proposed. However, these invisible digital watermarks have not been able to satisfy all the requirements identified by the Society of Motion Picture and Television Engineers (SMPTE) DC28.4 group.

This group recommends that watermarks be robust (difficult to remove without greatly degrading the quality of the content), secure (difficult to detect and remove), and efficient (embedding must fit into the distribution process chain without adding unacceptable delay) to be of real value as a deterrent to piracy.

Existing approaches have been vulnerable to at least one of the following processing techniques: lossy compression up to a level that does not produce visible image degradation; specialized filters; scaling, rotation, cropping, image/frame reflection, extraction, reflection, or a combination thereof.

Regardless of the merits of prior art methods, there is a need for improved watermarking techniques for digital data that prevents copying, forgery and distribution of media content. The present invention satisfies this need.

SUMMARY OF THE INVENTION

A visible first watermark and invisible second and third watermarks are embedded in digital media content, in order to protect the media content from piracy. A distribution entity generates first, second and third watermark keys, wherein the watermark keys are symmetric keys similar to cryptographic keys. The visible first watermark and invisible second and third watermarks can only be embedded in, removed from, and detected in the media content using the first, second and third watermark keys, respectively.

A distribution entity embeds the visible first watermark in the digital data using the first watermark key, and embeds an invisible second watermark in the digital data using the second watermark key. The distribution entity transmits the first and second watermark keys to a content provider, and transmits the first and third watermark keys to a displaying entity. The visible first watermark renders the digital data essentially useless during transmission from the distribution entity to a displaying entity, and the second watermark is used for forensic purposes to determine whether the digital data has been pirated during transmission from the distribution entity to the displaying entity.

The distribution entity transmits the media content with the embedded visible first watermark and invisible second watermark to the displaying entity, wherein the displaying entity removes the visible first watermark from the media content and embeds the invisible third watermark in the media content using the third watermark key. The third watermark is used for forensic purposes to determine whether the media content has been pirated during the presentation by the displaying entity.

BRIEF DESCRIPTION OF THE DRAWINGS

Referring now to the drawings in which like reference numbers represent corresponding parts throughout.

DETAILED DESCRIPTION OF THE INVENTION

Figure 1A:
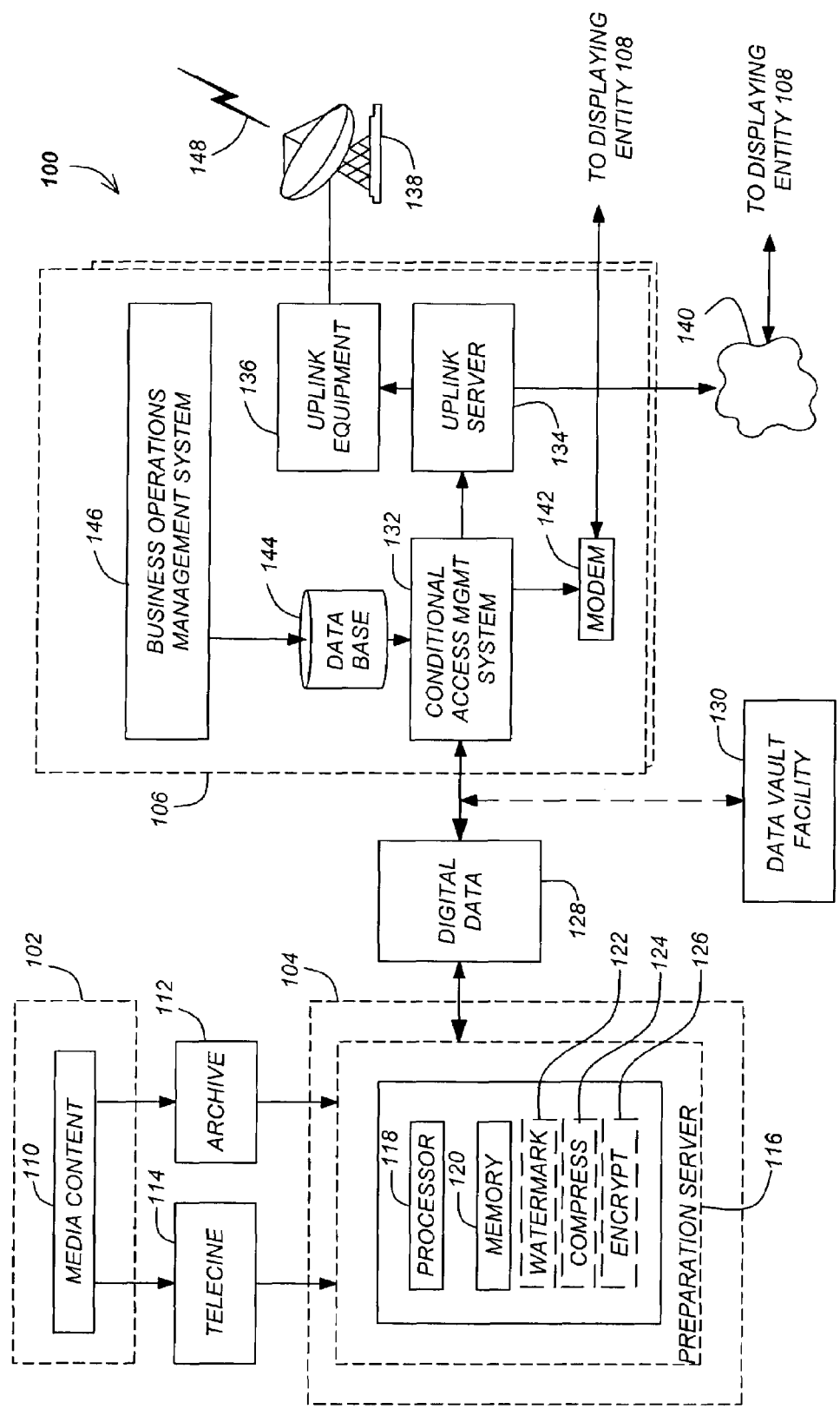
FIGS. 1A and 1B depict a top-level functional block diagram of one embodiment of a media content distribution system.

In the following description of the preferred embodiment, reference is made to the accompanying drawings, which form a part hereof, and in which is shown by way of illustration a specific embodiment in which the invention may be practiced. It is to be understood that other embodiments may be utilized and structural changes may be made without departing from the scope of the present invention.

Overview

The present invention uses a visible first watermark and invisible second and third watermarks in digital media content, in order to protect the media content from piracy. The visible first watermark and invisible second and third watermarks are embedded in each digital image or each frame of a digital video sequence comprising the media content.

The visible first watermark and invisible second and third watermarks are embedded into the media content by complex watermarking algorithms using symmetric keys. These keys instruct the watermarking algorithms to insert the watermarks into the media content following a unique complex sequence (in a manner similar to a cryptographic key). The symmetric keys for the visible first watermark and invisible second and third watermarks are generated by a distribution entity and are known as the first, second and third watermark keys, respectively. Each watermark can be embedded in removed from, or detected in the media content only using the respective watermark key.

Moreover, the watermark keys are stored in encrypted form, are transmitted between entities using encrypted communications, and are only decrypted on-the-fly or on-demand using authentication mechanisms, when the associated watermarks are to be embedded in, removed from, or detected in the media content. Further, the system prevents any attempt to save the watermark keys, or the media content without the visible first watermark, to an unauthorized data storage device, and may trigger an authentication request that can only be answered successfully by an authorized device with a registered authentication ID.

The first watermark key is transmitted from the distribution entity both to a content provider and a displaying entity, the second watermark key is transmitted from the distribution entity to the content provider, and the third watermark key is transmitted from the distribution entity to the displaying entity. Possession of the watermark keys is necessary to embed, remove and/or detect the watermarks.

Using the associated watermark keys, the distribution entity embeds the visible first watermark in the media content (to render the media content unusable) and also embeds the invisible second watermark in the media content (for forensic purposes). The visible first watermark is removed only at a projector located at the displaying entity, to lessen the chances of piracy during transmission. Moreover, the projector embeds the invisible third watermark in the media content (to track possible piracy during presentation).

Consequently, the present invention provides significant advantages over prior art approaches that rely merely on the encryption and decryption of the media content. Such prior art techniques add to equipment costs and complexity, affect overall transmission performance, require larger storage space, and are vulnerable to exploitation at each point of decryption.

Hardware Environment

Figure 1B:
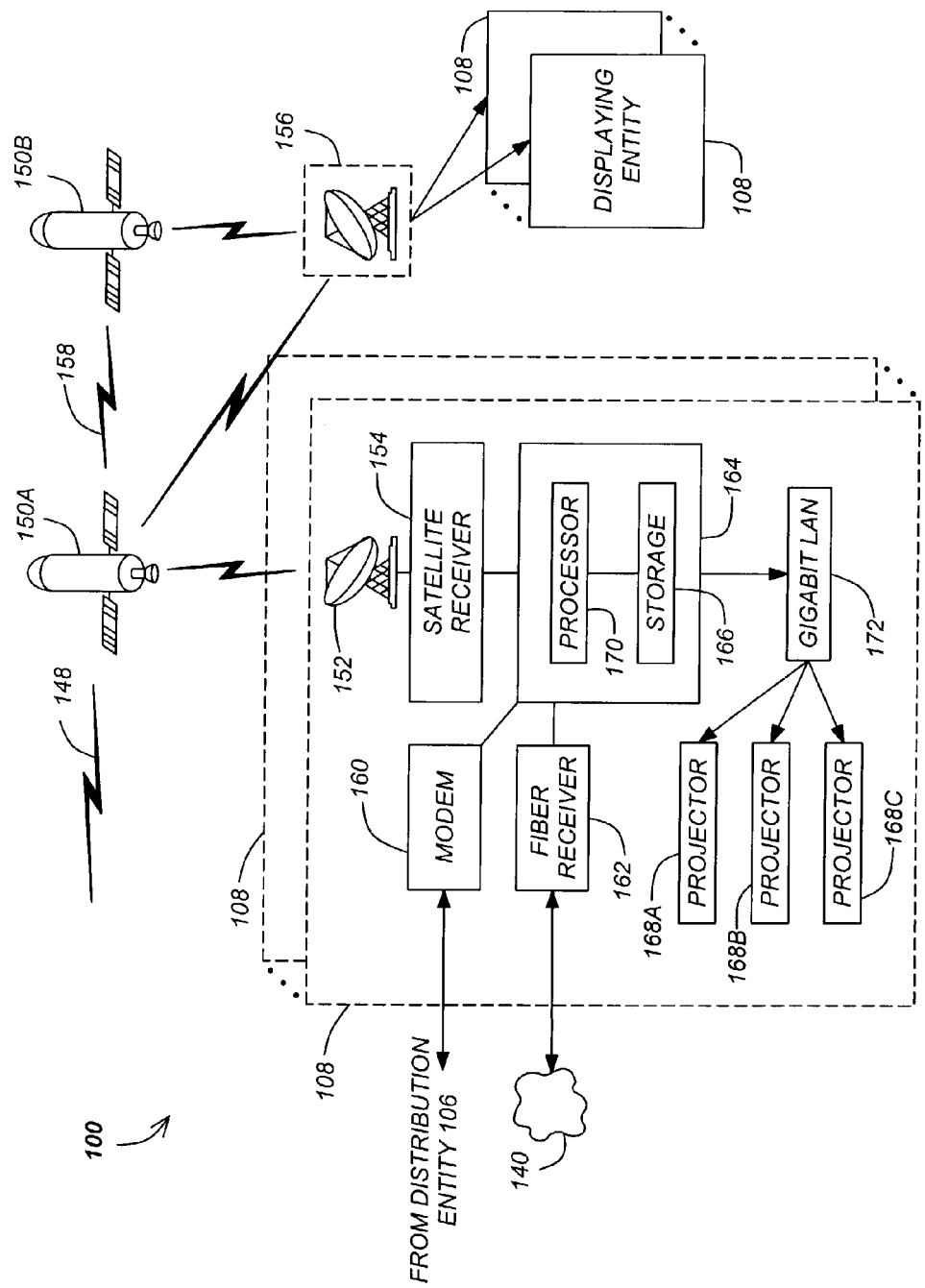

FIGS. 1A and 1B depict a top-level functional block diagram of one embodiment of a media content distribution system 100. The media content distribution system 100 comprises a content provider 102, a protection entity 104, a distribution entity 106 and one or more displaying entities 108. The content provider 102 provides media content 110 such as audiovisual material to the protection entity 104. The media content 110, which can be in digital or analog form, can be transmitted in electronic form via the Internet, by dedicated land-line, broadcast, or by physical delivery of a physical embodiment of the media (e.g. a celluloid film strip, optical or magnetic disk/tape). Content can also be provided to the protection entity 104 from a secure archive facility 112.

The media content 110 may be telecined by processor 114 to format the media content as desired. The telecine process can take place at the content provider 102, the protection entity 104, or a third party.

The protection entity 104 may include a media preparation processor 116. In one embodiment, the media preparation processor 116 includes a computer system such as a server, having a processor 118 and a memory 120 communicatively coupled thereto. The protection entity 104 further prepares the media content 110. Such preparation may include adding protection to the media content 110 to prevent piracy of the media content 110. For example, the preparation processor 116 can perform a watermarking process 122, apply a compression process 124, and/or perform an encrypting process 126 on the media content 110 to protect it, resulting in output digital data 128 containing the watermarked, compressed, and/or encrypted media content 110.

Once prepared, the output digital data 128 from the protection entity 104 can be transferred to the distribution entity 106 via digital transmission, tape or disk (e.g., CD-ROM, DVD, etc.). Moreover, the output digital data 128 can also be archived in a data vault facility 130 until it is needed.

Although illustrated as separate entities, the protection entity 104 is considered as a component of the distribution entity 106 in the preferred embodiment. This configuration ameliorates some of the security concerns regarding the transmission of the output digital data 128 between the protection entity 104 and the distribution entity 106.

The distribution entity 106 includes a conditional access management system (CAMS) 132, that accepts the output digital data 128, and determines whether access permissions are appropriate for the output digital data 128. Further, CAMS 132 may be responsible for additional encrypting so that unauthorized access during transmission is prevented.

Once the output digital data 128 is in the appropriate format and access permissions have been validated, CAMS 132 provides the output digital data 128 to an uplink server 134, ultimately for transmission by uplink equipment 136 to one or more displaying entities 108, as shown in FIG. 1B. This is accomplished by the uplink equipment 136 and uplink antenna 138.

In addition or in the alternative to transmission via satellite, the output digital data 128 can be provided to the displaying entity 108 via a forward channel fiber network 140. Additionally, the output digital data may be transmitted to displaying entity 108 via a modem 142 using, for example a public switched telephone network line. A land based communication such as through fiber network 140 or modem 142 is referred to as a back channel. Thus, information can be transmitted to and from the displaying entity 108 via the back channel or the satellite network. Typically, the back channel provides data communication for administration functions (e.g. keys, billing, authorization, usage tracking, etc.), while the satellite network provides for transfer of the output digital data 128 to the displaying entities 108.

The output digital data 128 may be securely stored in a database 144. Data is transferred to and from the database 144 under the control and management of the business operations management system (BOMS) 146. Thus, the BOMS 146 manages the transmission of information to 108, and assures that unauthorized transmissions do not take place.

Referring to FIG. 1B, the data transmitted via uplink 148 is received in a satellite 150A, and transmitted to a downlink antenna 152, which is communicatively coupled to a satellite or downlink receiver 154.

In one embodiment, the satellite 150A also transmits the data to an alternate distribution entity 156 and/or to another satellite 150B via crosslink 158. Typically, satellite 150B services a different terrestrial region than satellite 150A, and transmits data to displaying entities 108 in other geographical locations.

A typical displaying entity 108 comprises a modem 160 (and may also include a fiber receiver 158) for receiving and transmitting information through the back channel (i.e., via an communication path other than that provided by the satellite system described above) to and from the distribution entity 106. For example, feedback information (e.g. relating to system diagnostics, billing, usage and other administrative functions) from the exhibitor 108 can be transmitted through the back channel to the distribution entity 106. The output digital data 128 and other information may be accepted into a processing system 164 (also referred to as a content server). The output digital data 128 may then be stored in the storage device 166 for later transmission to displaying systems (e.g., digital projectors) 168A-168C. Before storage, the output digital data 128 can be decrypted to remove transmission encryption (e.g. any encryption applied by the CAMS 132), leaving the encryption applied by the preparation processor 116.

When the media content 110 is to be displayed, final decryption techniques are used on the output digital data 128 to substantially reproduce the original media content 110 in a viewable form which is provided to one or more of the displaying systems 168A-168C. For example, encryption 126, compression 124 and visible watermarking 122 applied by the preparation processor 118 is finally removed; however, any latent modification that is undetectable to viewers (e.g., invisible watermarking 122) is left intact. In one or more embodiments, a display processor 170 prevents storage of the decrypted media content 110 in any media, whether in the storage device 166 or otherwise. In addition, the media content 110 can be communicated to the displaying systems 168A-168C over an independently encrypted connection, such as on a gigabit LAN 172.

Generally, each of the components of the system 100 comprise hardware and/or software that is embodied in or retrievable from a computer-readable device, medium, signal or carrier, e.g., a memory, a data storage device, a remote device coupled to another device, etc. Moreover, this hardware and/or software perform the steps necessary to implement and/or use the present invention. Thus, the present invention may be implemented as a method, apparatus, or article of manufacture.

Of course, those skilled in the art will recognize many modifications may be made to the configuration described without departing from the scope of the present invention. Specifically, those skilled in the art will recognize that any combination of the above components, or any number of different components, may be used to implement the present invention, so long as similar functions are performed thereby.

Secure Distribution of Watermarked Media Content

Figure 2:
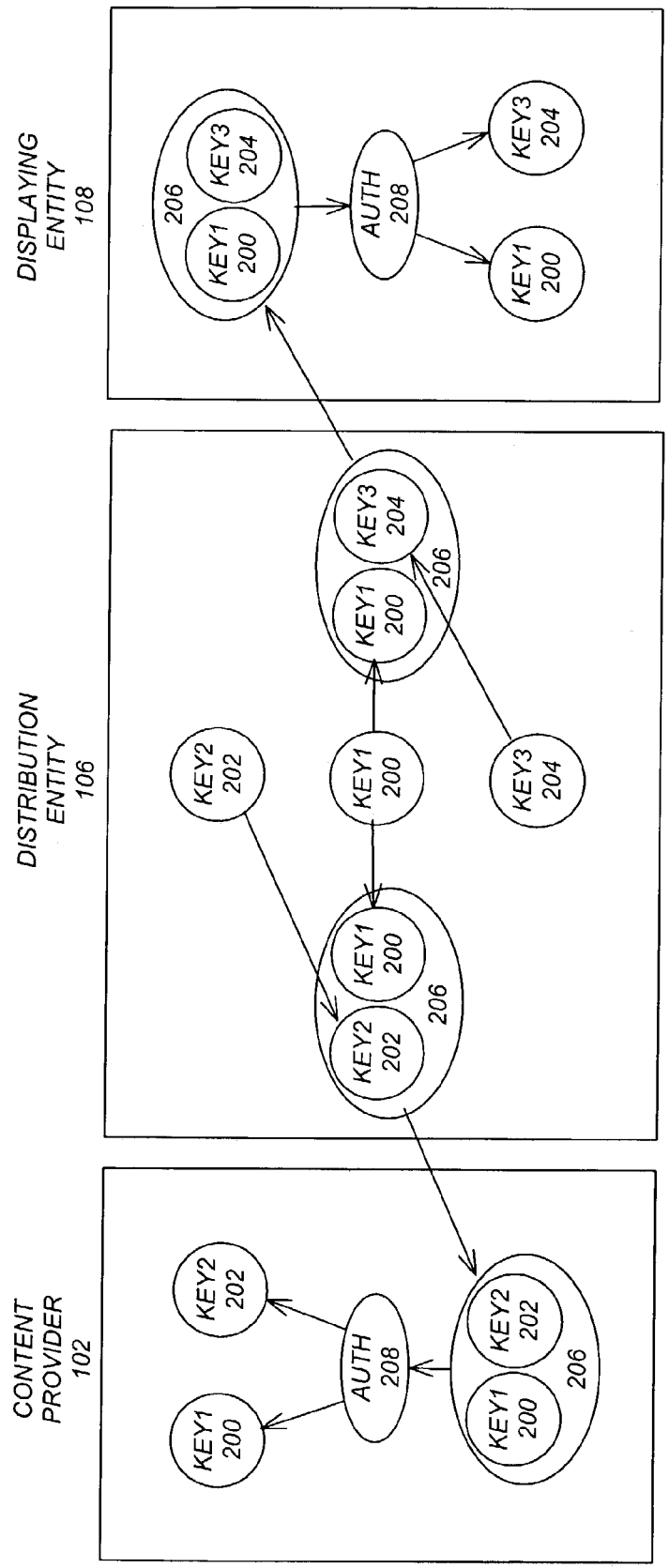
FIG. 2 is a dataflow diagram that illustrates the functions performed by the preferred embodiment of the present invention.

FIG. 2 is a dataflow diagram that illustrates the functions performed by the preferred embodiment of the present invention. The present invention uses a visible first watermark and invisible second and third watermarks in digital media content 110, in order to protect the media content 110 from piracy. The visible first watermark and invisible second and third watermarks are embedded in each digital image or each frame of a digital video sequence comprising the media content 110.

The visible first watermark and invisible second and third watermarks are embedded in the media content 110 by complex watermarking algorithms using symmetric keys. The symmetric keys for the visible first watermark and invisible second and third watermarks are known as the first, second and third watermark keys, respectively.

In the preferred embodiment, the distribution entity 106 generates the first, second and third watermark keys, labeled in FIG. 2 as Key1 200, Key2 202 and Key3 204. Key1 200 is the first watermark key for the visible first watermark, Key2 is the second watermark key for the invisible second watermark, and Key3 is the third watermark key for the invisible third watermark. Each watermark can be embedded in, removed from, or detected in the media content 110 only using the respective watermark key Key1 200, Key2 202 and Key3 204.

Key1 200 renders the media content 110 essentially useless during transmission from the distribution entity 106 to the displaying entity 108, where it is removed to return the media content 110 to its original visual form. Key2 202 is used by the content provider 102 for forensic purposes to help determine if the media content 110 was pirated during transmission from the distribution entity 106 to the displaying entity 108. Key3 204 may be combined with an identifier for the projector 168A-C, an identifier for a date and time of the presentation, and/or an identifier for the displaying entity 108, for forensic purposes to help determine if the media content 110 was pirated during presentation by the displaying entity 108.

The watermark keys Key1 200, Key2 202 and Key3 204 are stored by the various entities in encrypted form, are transmitted between entities using encrypted communications, and are only decrypted on-the-fly or on-demand using authentication mechanisms when the associated watermarks are to be embedded in or removed from the media content 110. The system prevents any attempt to save the watermark keys Key1 200, Key2 202 and Key3 204, or the media content 110 without the visible first watermark, to an unauthorized data storage device, and may trigger an authentication request that can only be answered successfully by an authorized device with a registered authentication ID.

Key1 200 and Key2 202 are used by the protection entity 104 associated with the distribution entity 106 to generate the visible first watermark and invisible second watermark that are embedded in the media content 110. Preferably, the visible first watermark and invisible second watermark are embedded into a digital image or in each frame of a digital video at the point of creation (e.g., after color correction and just before file compression). Thereafter, Key1 200 and Key2 202 are transmitted from the distribution entity 106 to the content provider 102 in a secure package 206.

Key1 200 and Key3 204 are also transmitted from the distribution entity 106 to the displaying entity 108 in a secure package 206. At the displaying entity 108, Key1 200 and Key3 204 are used by the projectors 168A-C associated with the displaying entity 108. Key1 200 is used by the projectors 168A-C to remove the visible first watermark embedded in the media content 110, and Key3 204 is used by the projectors 168A-C to generate the invisible second watermark that is embedded in the media content 110, prior to the presentation of the media content 110 by the projectors 168A-C.

The secure package 206 that transmits Key1 200, Key2 202 and Key3 204 between entities may be based on Internet Protocol Security (IPSEC) technology. IPSEC compliant products encrypt the secure package 206 with the intended recipient's public key and encapsulates the encrypted secure package 206 along with the headers with an authentication header. The intended recipient is then authenticated and uses its own unique private key to decrypt the secure package 206.

Moreover, Key1 200, Key2 202 and/or Key3 204 are stored in encrypted form, and are decrypted on-the-fly or on-demand, when embedding or removing the associated watermark, using an authentication (AUTH) mechanism 208 (such as a smart card or some other authentication method). Consequently, only the intended recipient, such as the content provider 102 or the projector 168A-C, having the proper authentication (AUTH) mechanism 208, can decrypt the encrypted Key1 200, Key2 202 and/or Key3 204.

For example, in the displaying entity 108, the media content 110 having the visible first watermark and invisible second watermark is stored in encrypted form in a local data storage device. Whenever the media content 110 is to be presented, the projector 168A-C performs a streaming decoding process to decrypt Key1 200 on-the-fly or on-demand using the authentication mechanism 208 and to remove the visible first watermark from the media content 110 using the decrypted Key1 200, prior to the presentation of the media content 110. Moreover, the projector 168A-C prevents any attempts to save the decrypted Key1 200, as well as the media content 110 without the visible first watermark, to any unauthorized data storage device. In addition, any such attempts may trigger an authentication request that can only be answered successfully by an authorized device with a registered authentication ID.

The projector 168A-C also performs a streaming decoding process to decrypt Key3 204 on-the-fly or on-demand using the authentication mechanism 208 and to embed the invisible third watermark into the media content 110 using the decrypted Key3 204. Again, the projector 168A-C prevents any attempts to save the decrypted Key3 204, as well as the media content 110 without the invisible third watermark, to any unauthorized data storage device. In addition, any such attempts may trigger an authentication request that can only be answered successfully by an authorized device with a registered authentication ID. Consequently, forensic analysis can determine which projector 168A-C (and possibly what date, time and/or venue) presented the media content 110, should the media content 110 be pirated during its presentation. This is also true if the media content 110 is merely copied from the presentation itself (e.g., using a camcorder).

The advantage of the present invention is that it eliminates the need to encrypt and decrypt large amounts of media content 110 for transmission and distribution between entities. This has the potential to improve performance, reduce errors, lower costs, and provide for easier operation and maintenance of the system. In addition, the use of non-encrypted media content 110 makes it easier for system operators to monitor the transmission of the media content 110.

Logic of the Secure Distribution Method

Figure 3:
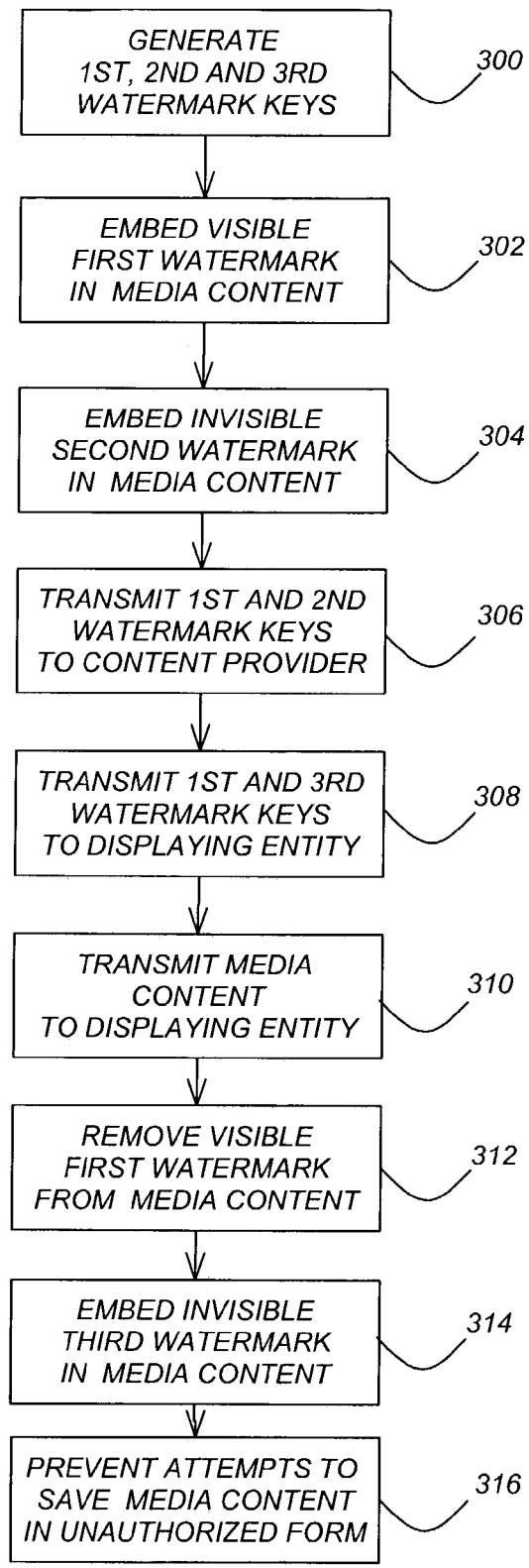
FIG. 3 is a flowchart that illustrates the steps performed by the distribution entity, displaying entity and content provider according to a preferred embodiment of the present invention.

FIG. 3 is a flowchart that illustrates the steps performed by the distribution entity 106, displaying entity 108 and content provider 102, respectively, according to a preferred embodiment of the present invention.

Block 300 represents generating first, second and third watermark keys at the distribution entity 106, wherein the first, second and third watermark keys are symmetric keys. The first, second and third watermarks are embedded in the media content 110 by one or more watermarking algorithms using the first, second and third watermark keys, respectively. Moreover, the first, second and third watermarks can only be removed from or detected in the media content 110 using the first, second and third watermark keys, respectively. Further, the first, second and third watermark keys are stored in encrypted form, and then decrypted on demand using an authentication mechanism.

Block 302 represents embedding a visible first watermark in the media content 110 using the first watermark key at the distribution entity 106. As noted above, the visible first watermark renders the media content 110 essentially useless for presentation purposes during transmission from the distribution entity 106 to the displaying entity 108. Moreover, the visible first watermark can only be removed with the first watermark key.

Block 304 represents embedding an invisible second watermark in the media content 110 using the second watermark key at the distribution entity 106. As noted above, the second watermark is used by a content provider 102 for forensic purposes to determine whether the media content 110 has been pirated during transmission from the distribution entity 106 to the displaying entity 108. Moreover, the invisible second watermark can only be detected using the second watermark key.

Block 306 represents transmitting the first and second watermark keys from the distribution entity 106 to a content provider 102. Preferably, the first and second watermark keys are transmitted from the distribution entity 106 to the content provider 102 in a secure package that is encrypted with the content provider's public key and is decrypted with the content provider's private key.

Block 308 represents transmitting the first and third watermark keys from the distribution entity 106 to a displaying entity 108. Preferably, the first and third watermark keys are transmitted from the distribution entity 106 to the displaying entity 108 in a secure package that is encrypted with the displaying entity's public key and is decrypted with the displaying entity's private key.

Block 310 represents transmitting the media content 110 from the distribution entity 106 to the displaying entity 108, wherein the displaying entity 108 removes the visible first watermark from the media content 110 and the displaying entity 108 embeds an invisible third watermark in the media content 110 using the third watermark key, as described in more detail below.

Block 312 represents removing the visible first watermark from the media content 110 only at the projector 168A-C located at the displaying entity 108, wherein the projector 168A-C performs a streaming decoding process to decrypt the first watermark key using an authentication mechanism and to remove the visible first watermark from the media content 110 using the decrypted first watermark key, prior to the presentation of the media content 110.

Block 314 represents embedding the invisible third watermark in the media content 110 only at the projector 168A-C located at the displaying entity 108, wherein the projector 168A-C performs a streaming decoding process to decrypt the third watermark key using an authentication mechanism and to embed the invisible third watermark in the media content 110 using the decrypted third watermark key, prior to the presentation of the media content 110.

In alternative embodiments, the invisible third watermark is combined with an identifier at the projector 168A-C for forensic purposes to determine whether the media content 110 is pirated during presentation by the displaying entity 108. The identifier may be selected from a group comprising an identifier for the projector 168A-C, an identifier for a data and time of the presentation, and/or an identifier for the displaying entity 108.

Block 316 represents the projector 168A-C preventing any attempts to save the decrypted Key1 200 or decrypted Key3, as well as the media content 110 without the visible first watermark, to an unauthorized data storage device. Moreover, any such attempts may trigger an authentication request that can only be answered successfully by an authorized device with a registered authentication ID.

CONCLUSION

This concludes the description of the preferred embodiment of the invention. The following paragraphs describe some alternative embodiments for accomplishing the same invention.

In alternative embodiments, any type of equipment or configuration of equipment could be used to implement the present invention. In addition, any watermarks that perform similar function could be used with the present invention.

In summary, the present invention discloses visible first watermark and invisible second and third watermarks that are embedded in digital media content, in order to protect the media content from piracy. The visible first watermark is embedded in and removed from the media content using the first watermark key. The invisible second and third watermarks are embedded in and can be detected from (for forensic purposes) the media content using the second and third watermark keys, respectively. Preferably, the first, second and third watermark keys are all symmetric keys. A distribution entity embeds the visible first watermark in the media content using the first watermark key and embeds an invisible second watermark in the media content using the second watermark key. The distribution entity transmits the media content with the embedded visible first watermark and invisible second watermark to a displaying entity, wherein the displaying entity removes the visible first watermark from the media content using the first watermark key and embeds the invisible third watermark in the media content using the third watermark key.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of watermarking digital media content, comprising:
   (a) generating first, second and third watermark keys at a distribution entity, wherein the first, second and third watermark keys are symmetric keys;
   (b) embedding a visible first watermark in the media content using the first watermark key at the distribution entity, wherein the visible first watermark can only be removed from the media content using the first watermark key;
   (c) embedding an invisible second watermark in the media content using the second watermark key at the distribution entity, wherein the invisible second watermark can only be detected from the media content using the second watermark key; and
   (d) transmitting the media content from the distribution entity to a displaying entity, wherein the displaying entity removes the visible first watermark from the media content using the first watermark key and the displaying entity embeds an invisible third watermark in the media content using the third watermark key, wherein the invisible third watermark can only be detected from the media content using the third watermark key.

2. The method of claim 1, wherein the first, second and third watermarks are embedded into the media content by one or more watermarking algorithms using the first, second and third watermark keys, respectively.

3. The method of claim 1, wherein the first watermark key for the visible first watermark is transmitted both to a content provider and the displaying entity.

4. The method of claim 1, wherein the second watermark key for the invisible second watermark is transmitted only to a content provider.

5. The method of claim 1, wherein the third watermark key for the invisible third watermark is transmitted only to the displaying entity.

6. The method of claim 1, wherein the first and second watermark keys are transmitted to a content provider in a secure package that is encrypted with the content provider's public key and is decrypted with the content provider's private key.

7. The method of claim 1, wherein the first and third watermark keys are transmitted to the displaying entity in a secure package that is encrypted with the displaying entity's public key and is decrypted with the displaying entity's private key.

8. The method of claim 1, wherein the first, second and third watermark keys are stored in encrypted form, and then decrypted using an authentication mechanism.

9. The method of claim 1, wherein the second watermark is used by a content provider for forensic purposes to determine whether the media content has been pirated during transmission from the distribution entity to the displaying entity.

10. The method of claim 1, wherein the visible first watermark renders the media content essentially useless for presentation.

11. The method of claim 1, wherein the visible first watermark is removed from the media content only at a digital projector located at the displaying entity.

12. The method of claim 11, wherein the projector performs a streaming decoding process to decrypt the first watermark and to remove the visible first watermark from the media content using the decrypted first watermark key, prior to its presentation.

13. The method of claim 1, wherein the invisible third watermark is embedded in the media content at a digital projector located at the displaying entity using the third watermark key, whenever the media content is to be presented.

14. The method of claim 13, wherein the invisible third watermark is combined with an identifier at the projector for forensic purposes to determine whether the media content is pirated during presentation by the displaying entity.

15. The method of claim 14, wherein the identifier is selected from a group comprising an identifier for the projector, an identifier for a data and time of the presentation, or an identifier for the displaying entity.

16. The method of claim 1, wherein an attempt to save the watermark keys or media content to an unauthorized data storage device is prevented.

17. The method of claim 16, wherein the attempt to save the watermark keys or media content to the unauthorized data storage device triggers an authentication request that can only be answered successfully by an authorized device with a registered authentication ID.

18. An apparatus for watermarking media content, comprising:
  (a) means for generating first, second and third watermark keys at a distribution entity, wherein the first, second and third watermark keys are symmetric keys;
  (b) means for embedding a visible first watermark in the media content using the first watermark key at the distribution entity, wherein the visible first watermark can only be removed from the media content using the first watermark key;
  (c) means for embedding an invisible second watermark in the media content using the second watermark key at the distribution entity, wherein the invisible second watermark can only be detected from the media content using the second watermark key; and
  (d) means for transmitting the media content from the distribution entity to a displaying entity, wherein the displaying entity removes the visible first watermark from the media content using the first watermark key and the displaying entity embeds an invisible third watermark in the media content using the third watermark key, wherein the invisible third watermark can only be detected from the media content using the third watermark key.

19. The apparatus of claim 18, wherein the first, second and third watermarks are embedded into the media content by one or more watermarking algorithms using the first, second and third watermark keys, respectively.

20. The apparatus of claim 18, wherein the first watermark key for the visible first watermark is transmitted both to a content provider and the displaying entity.

21. The apparatus of claim 18, wherein the second watermark key for the invisible second watermark is transmitted only to a content provider.

22. The apparatus of claim 18, wherein the third watermark key for the invisible third watermark is transmitted only to the displaying entity.

23. The apparatus of claim 18, wherein the first and second watermark keys are transmitted to a content provider in a secure package that is encrypted with the content provider's public key and is decrypted with the content provider's private key.

24. The apparatus of claim 18, wherein the first and third watermark keys are transmitted to the displaying entity in a secure package that is encrypted with the displaying entity's public key and is decrypted with the displaying entity's private key.

25. The apparatus of claim 18, wherein the first, second and third watermark keys are stored in encrypted form, and then decrypted using an authentication mechanism.

26. The apparatus of claim 18, wherein the second watermark is used by a content provider for forensic purposes to determine whether the media content has been pirated during transmission from the distribution entity to the displaying entity.

27. The apparatus of claim 18, wherein the visible first watermark renders the media content essentially useless for presentation.

28. The apparatus of claim 18, wherein the visible first watermark is removed from the media content only at a digital projector located at the displaying entity.

29. The apparatus of claim 28, wherein the projector performs a streaming decoding process to decrypt the first watermark and to remove the visible first watermark from the media content using the decrypted first watermark key, prior to its presentation.

30. The apparatus of claim 18, wherein the invisible third watermark is embedded in the media content at a digital projector located at the displaying entity using the third watermark key, whenever the media content is to be presented.

31. The apparatus of claim 30, wherein the invisible third watermark is combined with an identifier at the projector for forensic purposes to determine whether the media content is pirated during presentation by the displaying entity.

32. The apparatus of claim 31, wherein the identifier is selected from a group comprising an identifier for the projector, an identifier for a data and time of the presentation, or an identifier for the displaying entity.

33. The apparatus of claim 18, wherein an attempt to save the watermark keys or media content to an unauthorized data storage device is prevented.

34. The apparatus of claim 33, wherein the attempt to save the watermark keys or media content to the unauthorized data storage device triggers an authentication request that can only be answered successfully by an authorized device with a registered authentication ID.

35. A method of watermarking media content, comprising:
  (a) receiving media content from a distribution entity at a displaying entity, wherein the distribution entity generates first, second and third watermark keys, the first, second and third watermark keys are symmetric keys, and the distribution entity embeds a visible first watermark in the media content using the first watermark key, wherein the visible first watermark can only be removed from the media content using the first watermark key, and the distribution entity embeds an invisible second watermark in the media content using the second watermark key, and wherein the invisible second watermark can only be detected from the media content using the second watermark key;
  (b) removing the visible first watermark from the media content at the displaying entity using the first watermark key; and
  (c) embedding an invisible third watermark in the media content at the displaying entity using the third watermark key, wherein the invisible third watermark can only be detected from the media content using the third watermark key.

36. The method of claim 35, wherein the first, second and third watermarks are embedded into the media content by one or more watermarking algorithms using the first, second and third watermark keys, respectively.

37. The method of claim 35, wherein the first watermark key for the visible first watermark is transmitted both to a content provider and the displaying entity.

38. The method of claim 35, wherein the second watermark key for the invisible second watermark is transmitted only to a content provider.

39. The method of claim 35, wherein the third watermark key for the invisible third watermark is transmitted only to the displaying entity.

40. The method of claim 35, wherein the first and second watermark keys are transmitted to a content provider in a secure package that is encrypted with the content provider's public key and is decrypted with the content provider's private key.

41. The method of claim 35, wherein the first and third watermark keys are transmitted to the displaying entity in a secure package that is encrypted with the displaying entity's public key and is decrypted with the displaying entity's private key.

42. The method of claim 35, wherein the first, second and third watermark keys are stored in encrypted form, and then decrypted using an authentication mechanism.

43. The method of claim 35, wherein the second watermark is used by a content provider for forensic purposes to determine whether the media content has been pirated during transmission from the distribution entity to the displaying entity.

44. The method of claim 35, wherein the visible first watermark renders the media content essentially useless for presentation.

45. The method of claim 35, further comprising removing the visible first watermark from the media content only at a digital projector located at the displaying entity.

46. The method of claim 45, wherein the projector performs a streaming decoding process to decrypt the first watermark and to remove the visible first watermark from the media content using the decrypted first watermark key, prior to its presentation.

47. The method of claim 35, further comprising embedding the invisible third watermark in the media content at a digital projector located at the displaying entity using the third watermark key, whenever the media content is to be presented.

48. The method of claim 47, wherein the invisible third watermark is combined with an identifier at the projector for forensic purposes to determine whether the media content is pirated during presentation by the displaying entity.

49. The method of claim 48, wherein the identifier is selected from a group comprising an identifier for the projector, an identifier for a data and time of the presentation, or an identifier for the displaying entity.

50. The method of claim 35, farther comprising preventing any attempt to save the watermark keys or media content to an unauthorized data storage device.

51. The method of claim 50, wherein the attempt to save the watermark keys or media content to an unauthorized data storage device triggers an authentication request that can only be answered successfully by an authorized device with a registered authentication ID.

52. An apparatus for watermarking media content, comprising:
(a) means for receiving media content from a distribution entity at a displaying entity, wherein the distribution entity generates first, second and third watermark keys, the first, second and third watermark keys are symmetric keys, and the distribution entity embeds a visible first watermark in the media content using the first watermark key, wherein the visible first watermark can only be removed from the media content using the first watermark key, and the distribution entity embeds an invisible second watermark in the media content using the second watermark key, and wherein the invisible second watermark can only be detected from the media content using the second watermark key;
(b) means for removing the visible first watermark from the media content at the displaying entity using the first watermark key; and
(c) means for embedding an invisible third watermark in the media content at the displaying entity using the third watermark key, wherein the invisible third watermark can only be detected from the media content using the third watermark key.

53. The apparatus of claim 52, wherein the first, second and third watermarks are embedded into the media content by one or more watermarking algorithms using the first, second and third watermark keys, respectively.

54. The apparatus of claim 52, wherein the first watermark key for the visible first watermark is transmitted both to a content provider and the displaying entity.

55. The apparatus of claim 52, wherein the second watermark key for the invisible second watermark is transmitted only to a content provider.

56. The apparatus of claim 52, wherein the third watermark key for the invisible third watermark is transmitted only to the displaying entity.

57. The apparatus of claim 52, wherein the first and second watermark keys are transmitted to a content provider in a secure package that is encrypted with the content provider's public key and is decrypted with the content provider's private key.

58. The apparatus of claim 52, wherein the first and third watermark keys are transmitted to the displaying entity in a secure package that is encrypted with the displaying entity's public key and is decrypted with the displaying entity's private key.

59. The apparatus of claim 52, wherein the first, second and third watermark keys are stored in encrypted form, and then decrypted using an authentication mechanism.

60. The apparatus of claim 52, wherein the second watermark is used by a content provider for forensic purposes to determine whether the media content has been pirated during transmission from the distribution entity to the displaying entity.

61. The apparatus of claim 52, wherein the visible first watermark renders the media content essentially useless for presentation.

62. The apparatus of claim 52, further comprising means for removing the visible first watermark from the media content only at a digital projector located at the displaying entity.

63. The apparatus of claim 62, wherein the projector performs a streaming decoding process to decrypt the first watermark and to remove the visible first watermark from the media content using the decrypted first watermark key, prior to its presentation.

64. The apparatus of claim 52, further comprising means for embedding the invisible third watermark in the media content at a digital projector located at the displaying entity using the third watermark key, whenever the media content is to be presented.

65. The apparatus of claim 64, wherein the invisible third watermark is combined with an identifier at the projector for forensic purposes to determine whether the media content is pirated during presentation by the displaying entity.

66. The apparatus of claim 65, wherein the identifier is selected from a group comprising an identifier for the projector, an identifier for a data and time of the presentation, or an identifier for the displaying entity.

67. The apparatus of claim 52, further comprising means for preventing any attempt to save the watermark keys or media content to an unauthorized data storage device.

68. The apparatus of claim 67, wherein the attempt to save the watermark keys or media content to an unauthorized data storage device triggers an authentication request that can only be answered successfully by an authorized device with a registered authentication ID.

69. A method of watermarking media content, comprising:
(a) receiving first and second watermark keys from a distribution entity at a content provide, wherein the distribution entity generates the first, second and third watermark keys, the first, second and third watermark keys are symmetric keys, the distribution entity embeds a visible first watermark in the media content using the first watermark key, wherein the visible first watermark can only be removed from the media content using the first watermark key, and the distribution entity embeds an invisible second watermark in the media content using the second watermark key, wherein the invisible second watermark can only be detected from the media content using the second watermark key, and a displaying entity removes the visible first watermark from the media content using the first watermark key and embeds an invisible third watermark in the media content using the third watermark key, and wherein the invisible third watermark can only be detected from the media content using the third watermark key.

70. The method of claim 69, wherein the first, second and third watermarks are embedded into the media content by one or more watermarking algorithms using the first, second and third watermark keys, respectively.

71. The method of claim 69, wherein the first watermark key for the visible first watermark is transmitted both to the content provider and the displaying entity.

72. The method of claim 69, wherein the second watermark key for the invisible second watermark is transmitted only to the content provider.

73. The method of claim 69, wherein the third watermark key for the invisible third watermark is transmitted only to the displaying entity.

74. The method of claim 69, wherein the first and second watermark keys are transmitted to a content provider in a secure package that is encrypted with the content provider's public key and is decrypted with the content provider's private key.

75. The method of claim 69, wherein the first and third watermark keys are transmitted to the displaying entity in a secure package that is encrypted with the displaying entity's public key and is decrypted with the displaying entity's private key.

76. The method of claim 69, wherein the first, second and third watermark keys are stored in encrypted form, and then decrypted using an authentication mechanism.

77. The method of claim 69, wherein the second watermark is used by the content provider for forensic purposes to determine whether the media content has been pirated during transmission from the distribution entity to the displaying entity.

78. The method of claim 69, wherein the visible first watermark renders the media content essentially useless for presentation.

79. The method of claim 69, wherein the visible first watermark is removed from the media content only at a digital projector located at the displaying entity.

80. The method of claim 79, wherein the projector performs a streaming decoding process to decrypt the first watermark and to remove the visible first watermark from the media content using the decrypted first watermark key, prior to its presentation.

81. The method of claim 69, wherein the invisible third watermark is embedded in the media content at a digital projector located at the displaying entity using the third watermark key, whenever the media content is to be presented.

82. The method of claim 81, wherein the invisible third watermark is combined with an identifier at the projector for forensic purposes to determine whether the media content is pirated during presentation by the displaying entity.

83. The method of claim 82, wherein the identifier is selected from a group comprising an identifier for the projector, an identifier for a data and time of the presentation, or an identifier for the displaying entity.

84. The method of claim 69, wherein an attempt to save the watermark keys or media content to an unauthorized data storage device is prevented.

85. The method of claim 84, wherein the attempt to save the watermark keys or media content to the unauthorized data storage device triggers an authentication request that can only be answered successfully by an authorized device with a registered authentication ID.

86. An apparatus for watermarking media content, comprising:
(a) means for receiving first and second watermark keys from a distribution entity at a content provider, wherein the distribution entity generates the first, second and third watermark keys, the first, second and third watermark keys are symmetric keys, the distribution entity embeds a visible first watermark in the media content using the first watermark key, wherein the visible first watermark can only be removed from the media content using the first watermark key, and the distribution entity embeds an invisible second watermark in the media content using the second watermark key, wherein the invisible second watermark can only be detected from the media content using the second watermark key, and a displaying entity removes the visible first watermark from the media content using the first watermark key and embeds an invisible third watermark in the media content using the third watermark key, and wherein the invisible third watermark can only be detected from the media content using the third watermark key.

87. The apparatus of claim 86, wherein the first, second and third watermarks are embedded into the media content by one or more watermarking algorithms using the first, second and third watermark keys, respectively.

88. The apparatus of claim 86, wherein the first watermark key for the visible first watermark is transmitted both to the content provider and the displaying entity.

89. The apparatus of claim 86, wherein the second watermark key for the invisible second watermark is transmitted only to the content provider.

90. The apparatus of claim 86, wherein the third watermark key for the invisible third watermark is transmitted only to the displaying entity.

91. The apparatus of claim 86, wherein the first and second watermark keys are transmitted to the content provider in a secure package that is encrypted with the content provider's public key and is decrypted with the content provider's private key.

92. The apparatus of claim 86, wherein the first and third watermark keys are transmitted to the displaying entity in a scenic package that is encrypted with the displaying entity's public key and is decrypted with the displaying entity's private key.

93. The apparatus of claim 86, wherein the first, second and third watermark keys are stored in encrypted form, and then decrypted using an authentication mechanism.

94. The apparatus of claim 86, wherein the second watermark is used by the content provider for forensic purposes to determine whether the media content has been pirated during transmission from the distribution entity to the displaying entity.

95. The apparatus of claim 86, wherein the visible first watermark renders the media content essentially useless for presentation.

96. The apparatus of claim 86, wherein the visible first watermark is removed from the media content only at a digital projector located at the displaying entity.

97. The apparatus of claim 96, wherein the projector performs a streaming decoding process to decrypt the first watermark and to remove the visible first watermark from the media content using the decrypted first watermark key, prior to its presentation.

98. The apparatus of claim 86, wherein the invisible third watermark is embedded in the media content at a digital projector located at the displaying entity using the third watermark key, whenever the media content is to be presented.

99. The apparatus of claim 98, wherein the invisible third watermark is combined with an identifier at the projector for forensic purposes to determine whether the media content is pirated during presentation by the displaying entity.

100. The apparatus of claim 99, wherein the identifier is selected from a group comprising an identifier for the projector, an identifier for a data and time of the presentation, or an identifier for the displaying entity.

101. The apparatus of claim 86, wherein an attempt to save the watermark keys or media content to an unauthorized data storage device is prevented.

102. The apparatus of claim 101, wherein the attempt to save the watermark keys or media content to an unauthorized data storage device triggers an authentication request that can only be answered successfully by an authorized device with a registered authentication ID.

* * * * *